(12) United States Patent
Lazar

(10) Patent No.: US 6,616,874 B1
(45) Date of Patent: *Sep. 9, 2003

(54) METHOD FOR FORMING A REFLECTIVE CONCRETE BLOCK

(76) Inventor: Michael Lazar, Block 214 #24-806 Marsiling Lane, Singapore (SG), 730214

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,850
(22) PCT Filed: Nov. 20, 1997
(86) PCT No.: PCT/SG97/00059
§ 371 (c)(1), (2), (4) Date: Jul. 20, 1998
(87) PCT Pub. No.: WO98/22269
PCT Pub. Date: May 28, 1998

(30) Foreign Application Priority Data

Nov. 20, 1996 (SG) .......................... 9611324-6

(51) Int. Cl.[7] .................. B28B 3/04; B28B 3/10; B28B 1/08; B28B 23/00; B28B 7/24
(52) U.S. Cl. .................. 264/71; 264/77; 264/245; 264/256; 264/271.1; 264/333; 425/130; 425/256; 425/257; 425/258
(58) Field of Search .................. 264/71, 333, 256, 264/271.1, 279.9, 77, 245; 425/130, 256, 257, 258

(56) References Cited

U.S. PATENT DOCUMENTS

| | | | |
|---|---|---|---|
| 2,648,115 A | * | 8/1953 | Maramonte |
| 3,216,464 A | * | 11/1965 | Horst |
| 3,484,514 A | * | 12/1969 | Longinotti .................. 264/163 |
| 3,955,907 A | * | 5/1976 | Yamasita et al. |
| 4,172,063 A | * | 10/1979 | O'Brill .................. 260/29.6 S |
| 4,218,260 A | * | 8/1980 | Metzler .................. 106/98 |
| 4,880,467 A | * | 11/1989 | Rirsch et al. .................. 106/85 |
| 5,250,113 A | * | 10/1993 | Berke et al. .................. 106/737 |
| 5,277,853 A | * | 1/1994 | Allison et al. .................. 264/71 |
| 5,423,634 A | * | 6/1995 | Fujita et al. .................. 264/256 |
| 5,595,698 A | * | 1/1997 | Nicholas et al. .................. 264/333 |
| 5,622,556 A | * | 4/1997 | Shulman .................. 264/333 |

FOREIGN PATENT DOCUMENTS

| | | |
|---|---|---|
| DE | 637871 | 8/1983 |
| EP | A10-097213 | 1/1984 |
| EP | 0493858 A1 * | 7/1992 |
| GB | 2159556 A | 12/1985 |
| GB | 2200936 | 8/1988 |
| JP | 4-149305 A * | 5/1992 |
| JP | 6-99418 A * | 4/1994 |

OTHER PUBLICATIONS

Adylkhodzhaev et al.; Concrete Mixt. Having Increased Strength—Contains Cement, Quartz Sand of Specified Fractional Compsn., Two Fractions of Granite Gravel and Water; May 7, 1993; Derwent Database; Abstract.*
British Standard 6717 : Part 1: 1993.
British Standard 7263 : Part 1 : 1994.
British Standard 7263 —1 : 1999.
British Standard 7263 : Part 1 : 1990.
Betonwerk+BFT Fertigteil–Technik, No. 2, 1997, Hegger et al; "Hochleistungsbeton im Fertigeilbau" p. 82, table, last line.

* cited by examiner

Primary Examiner—Jill L. Heitbrink
Assistant Examiner—Michael I. Poe
(74) Attorney, Agent, or Firm—Birch, Stewart, Kolasch & Birch, LLP

(57) ABSTRACT

A method forms a concrete block, particularly but not exclusively a composite block with a reflective fascia portion. The block is formed by a dry-cast technique, in which mixture for forming the block has a water/cement ratio less than or equal to 0.35, in combination with application of a compaction force so that the resultant block complies with compressive strength requirements set out in BS 6717: part 1: 1993.

13 Claims, 4 Drawing Sheets

METHOD FOR FORMING A REFLECTIVE CONCRETE BLOCK

This application claims the benefit under 35 U.S.C. §371 of prior PCT International Application No. PCT/SG97/00059 which has an International filing date of Nov. 20, 1997 which designated the United States of America, the entire contents of which are hereby incorporated by references.

FIELD OF THE INVENTION

The present invention relates to a method for forming a concrete block particularly, but not exclusively, a composite block having a base portion and a reflective fascia portion.

Throughout the specification and claims, use of the word "block" is to be taken as including, for example, a curb stone, road divider or paver constructed wholly or in part of concrete or like substance.

DESCRIPTION OF THE BACKGROUND ART

A form of composite block is disclosed in GB2159556A. Such a block includes a base portion and a reflective fascia portion, and is formed by placing a base mix and facia mix in a mould and compressing same to remove excess water.

Another concrete block, in the form of a curb stone, is disclosed in GB2200936. The curb stone includes reflective material and is formed by randomly mixing the reflective material with fluid concrete, or pressing the material into the concrete when the curb stone is partially cured.

Both of the above known forms of concrete block are manufactured by a wet casting technique and curing of the blocks can take a considerable time, in the order of three days.

It is an object of the present invention to provide a method and apparatus for forming a block which utilises a dry casting technique. To the applicants knowledge, dry casting has never been used to manufacture curb stones for the reason that it is generally considered that dry casting would result in a block of inferior strength and durability and that the wet casting method was prescribed in order to meet the requirements for curb stones, as set out under British Standard BS 7263: Part 1: 1990, published by British Standards Institution, London. The present invention, however, utilises dry casting, in combination with a compacting step whereby the resultant block is capable of meeting the requirements of BS 6717: Part 1: 1993.

In accordance with the present invention there is provided a method of forming a concrete block comprising preparing a base mix, having a water/cement ratio of less than or substantially equal to 0.35, pouring the base mix into a mould and pressurising the mix by application of a compaction.

Preferably a fascia mix is poured into the mould prior to application of the compaction force whereby both the base mix and fascia mix are pressurised.

Preferably, the base mix is compressed prior to application of the compaction force so as to create a recess defined by the base mix and the mould, into which the fascia mix is poured.

Preferably the fascia mix includes reflective material. Alternatively, the facia mix is provided on a surface thereof with reflective material prior to compaction.

Preferably, a binding agent is provided between the base mix and facia mix prior to compaction.

Preferably the base mix is subjected to vibration prior to application of the compaction force so as to enhance filling of the mould and subsequent compaction.

Preferably preparing the base mix includes mixing cement with granite chips, not exceeding 9 mm in diameter, and sand particles not exceeding 5 mm in diameter, to enhance binding properties of the block.

In another aspect, there is provided an apparatus for effecting the above method including:

mixing means for mixing a base mix and a fascia mix;

a mould assembly including a mould and a feeder for receiving the base mix and fascia mix and transferring the base mix and fascia mix into the mould; and a ram device for applying a compaction force to the mix held in the mould.

Preferably the mould assembly includes a vibration device for vibrating the mould to enhance filling of the mould and subsequent compaction.

Preferably the ram device is adapted for application of a vibro compaction force.

Preferably the feeder includes two portions for holding, respectively, the base mix and fascia mix, the feeder being arranged such that the portions are adapted to be alternately displaced over the mould for separate dispensing of the base mix and fascia mix within the mould.

In another aspect, there is provided a concrete block formed in accordance with the above described method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is more fully described, by way of non-limiting example only, with reference to the accompanying drawings, in which:

FIG. 3b is a side view of the block of FIG. 3a;

SUMMARY OF THE INVENTION

Figure 1:
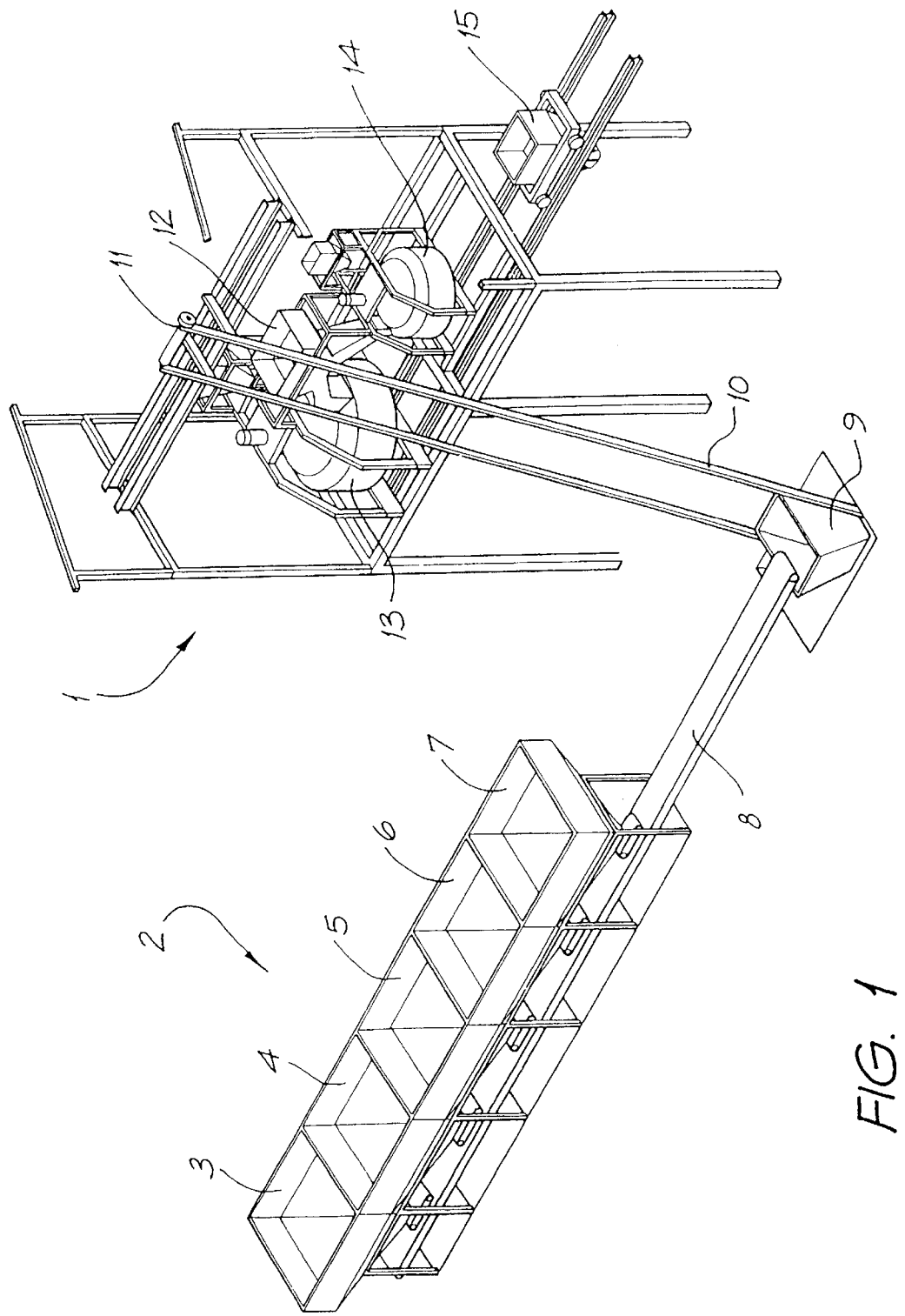
FIG. 1 is a perspective view of a mixing assembly.

A mixing assembly 1 is shown in FIG. 1, together with a supply assembly 2 which is arranged to supply component material to the mixing assembly.

The supply assembly 2 includes a number of hoppers 3 to 7 arranged to dispense component materials onto a main conveyor 8 which transports the materials to a skip 9. The skip 9 is itself arranged to travel along a track 10 which causes the skip to invert at the upper end 11 thereof so as to discharge the materials in an input hopper 12 of the mixing assembly 1. The materials in the hopper are transferred into either a first mixing device 13 for a base mix or a second mixing device 14 for a fascia mix.

In one mode of production, hoppers 3, 4 and 5 contain granite chippings, course sand and fine sand, respectively. Hopper 6 would contain silica sand and hopper 7 could contain glass beads. Component material for a base mix could then be obtained by dispensing pre-determined quantities of chippings and sand from hoppers 3 to 5 and transferring these into the mixing device 13 for the base mix via the conveyor 8 and skip 9. Component material for the fascia mix may similarly be obtained by discharging a pre-determined amount of material from hoppers 5 to 7 and transferring same into the mixing device 14 for the fascia mix.

The base mix preferably includes the following components:

| Description of raw materials | Quantity |
|---|---|
| Ordinary Portland Cement | 20% of the weight of sand and aggregates |
| Fine Sand 0.1 to 3 mm | 08% |
| Sand 0.4 to 0.5 mm | 60% |
| 5–9 mm granite chips | 32% |
| Additive | 2 to 3% of cement weight |
| Water/Cement ratio | 30 kgs (0.28 to 0.35) |

The fascia mix preferably includes the following components, including reflective elements which are used to create a resultant layer not less than 8 mm on the blocks:

| Description of raw materials | Quantity |
|---|---|
| Silica Sand | 50% |
| Fine sand 0.1 to 3 mm | 10% |
| White chips | 10% |
| White cement | 30% |
| White pigment (Titanium dioxide) | 5 to 7% of the cement weight |
| or Yellow Pigment | 7 to 9% of the cement weight |
| or Red Pigment | 5 to 7% of the cement weight |
| Glass beads 250–800 microns | 20% to 35% of total mix |
| Additive or binding agent | 5% of the cement weight |
| Water/Cement ratio | 30 kgs (0.28 to 0.35) |

The cement, water and other component materials not provided for by the hoppers 3 to 7 may be added directly at the mixing assembly, either automatically or manually.

Figure 2:
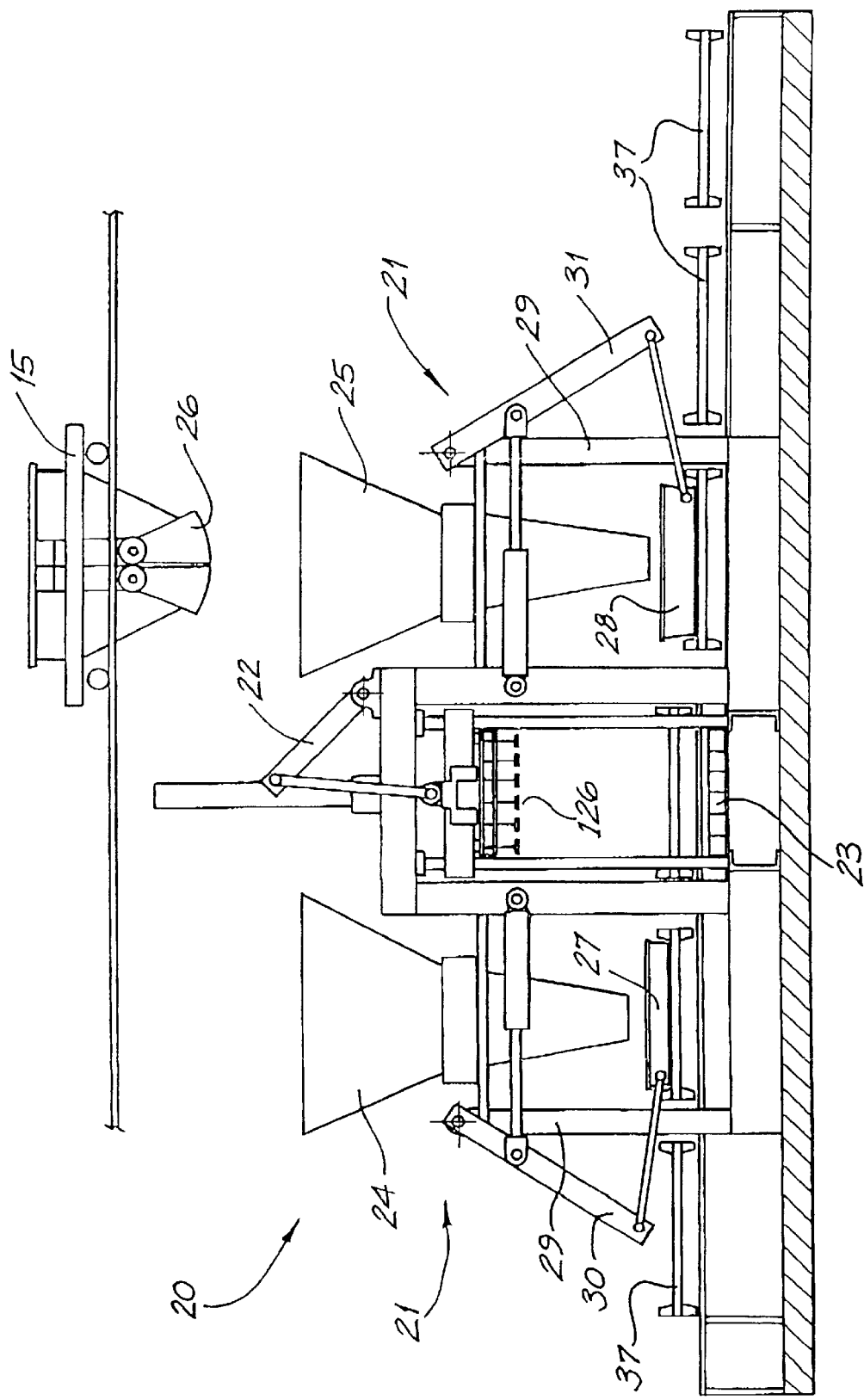
FIG. 2 is a perspective view of a mould assembly.

The supply assembly and mixing assembly is preferably operated so as to produce a base mix and face mix alternately. When mixing of either the base mix or fascia mix is complete, the resultant mix is discharged into a bucket conveyor 15 which is adapted to move between outputs (not shown) of the mixing devices and the mould assembly 20 shown in FIG. 2. As an alternative to the bucket conveyor, a belt conveyor could instead be used or the mixing assembly arranged to discharge the mix directly to the mould assembly.

The mould assembly 20 includes a feeder mechanism 21, a ram device 22 and a mould 23. The feeder mechanism 21 includes two feed hoppers 24, 25 positioned on either side of an hydraulically operated ram head 126 of the ram device 22, which is in turn located above the mould 23. The feeder also includes a tray portion 27, 28 positioned beneath a respective hopper 24, 25. The tray portions are interconnected to a frame 29 of the mould assembly 20 by articulated arms 30, 31 which allow the portions 27, 28 to slide from a discharging position over the mould to a laterally displaced position beneath a respective hopper 24, 25.

In operation, the bucket conveyor 15 moves from the mixing assembly 1 to the mould assembly 20 and is positioned over either feed hopper 24 or 25, depending upon the mix carried by the bucket conveyor. A shutter mechanism 26 is actuated in the bottom of the bucket conveyor to discharge the mix into the respective hopper. The mix is then dispensed on to the associated tray portion 27, 28 which is subsequently caused to slide over the mould whereupon to discharge the mix into the mould.

The mould assembly is also provided with a vibration device (not shown) which is then actuated to impart vibrationary motion to the mould to help facilitate filling of the mould and enhance compaction. The ram head is then lowered into the mould to marginally compact the base mix so as to leave a cavity of approximately 15 mm between the top of the mould and the base mix. The filling process, vibration and initial compaction takes about 10 seconds to complete. The ram head is then raised and fascia mix which has previously been discharged into tray portion 28, is deposited on top of the base mix, together with reflective material. If required, additives and additional binding agents may be provided in the cavity prior to addition of the fascia mix. The ram head is again lowered and a vibro-compaction force exerted to compress the base and fascia mix. The hydraulics of the ram head are preferably operable to provide simple harmonic vibrations of up to 3,600 rpm's, with a maximum compression pressure exerted on the block mix in the order of 120 bars. Filling the mould with the fascia mix takes about 4 seconds and the subsequent compaction lasts for about 4 to 6 seconds. The mould assembly is therefore capable of executing about 5 working cycles per minute.

Figure 3A:
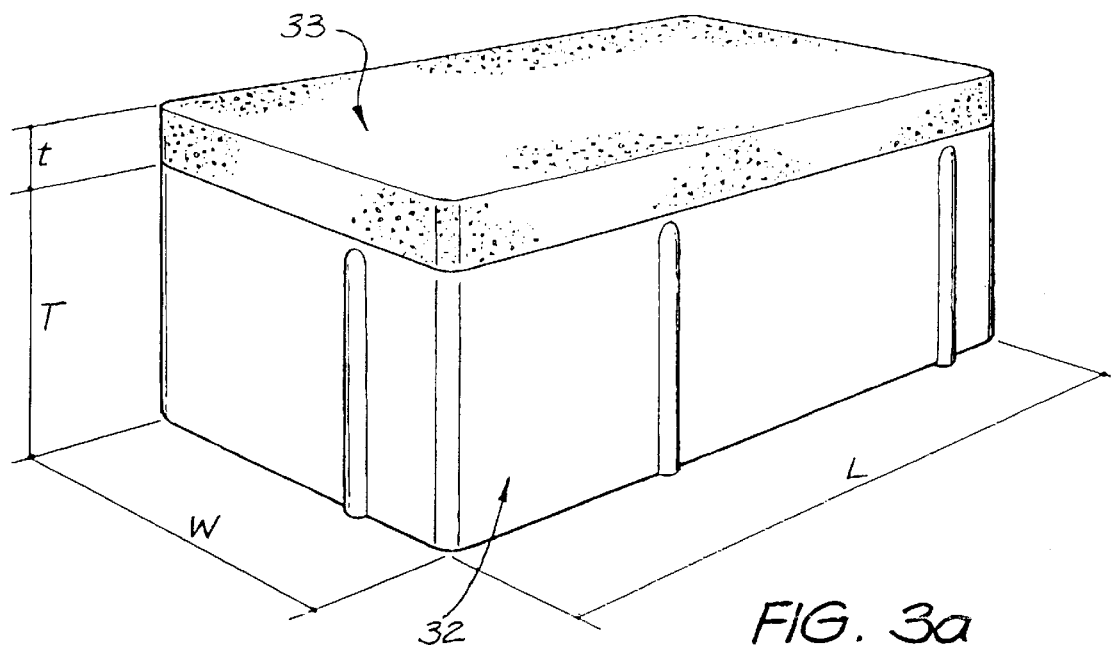
FIG. 3a is an isometric view of a composite block.
Figure 3B:
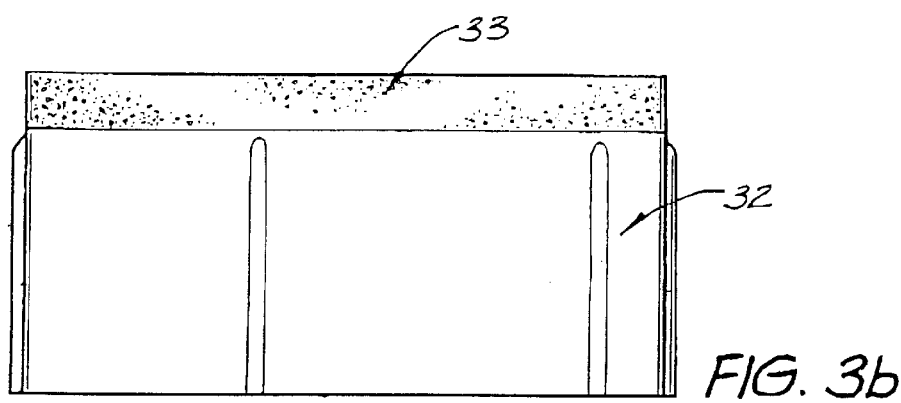
Figure 3C:
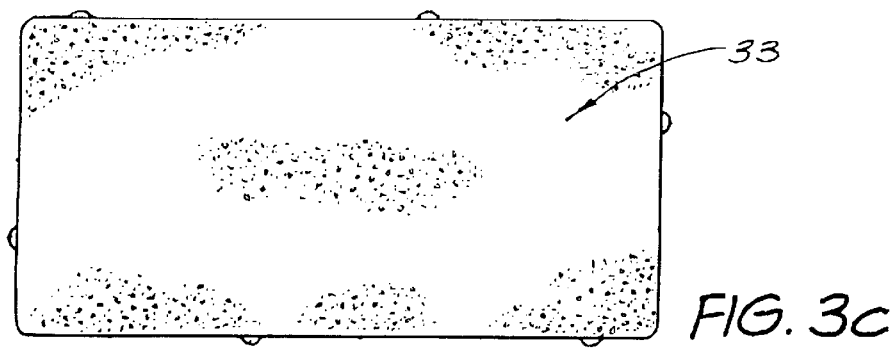
FIG. 3c is a plan view of the block of FIGS. 3a and 3b.

The resultant blocks are demoulded in the form shown in FIG. 3, with a compacted base component 32 having a thickness 'T' in the order of, for example, 80 mm and a fascia component 33 in the order of, for example, not less than 10 mm in thickness 't'. The length of the block 'L' may be in the order of 200 mm and the width 'W' in the order of 100 mm although the particular configuration and block dimensions may be varied as desired.

Figure 4:
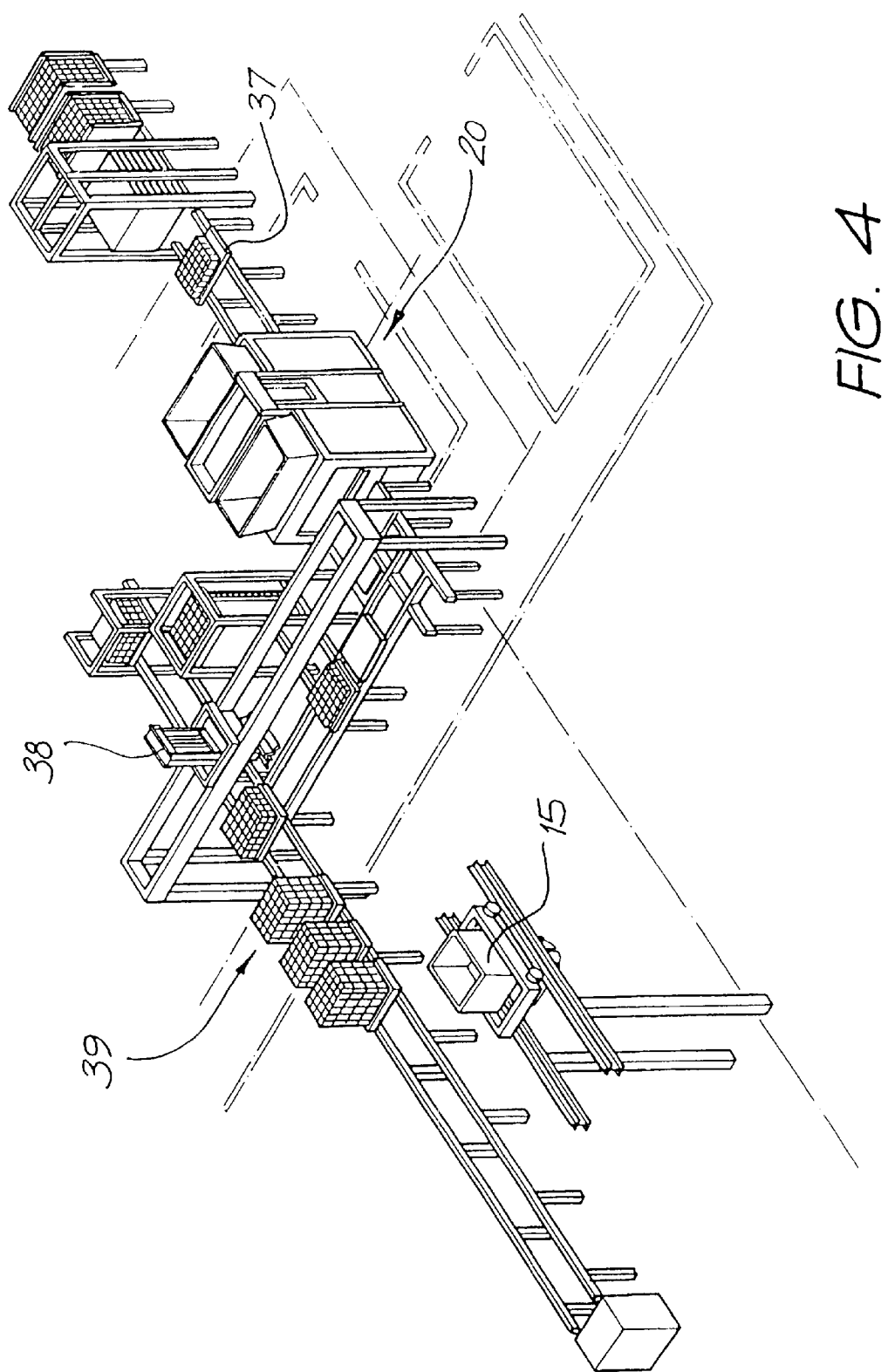
FIG. 4 is a perspective view showing part of an apparatus used for batching blocks, formed in accordance with the present invention.

The blocks can be demoulded directly onto a pallet 37, as illustrated in FIG. 4, which is transported via conveyor to a rack, for removal by forklift, and placement in a curing chamber. Curing may take 8 to 12 hours, after which the blocks will be solid enough for handling and packing. Packing may be facilitated by passing the pallet beneath a clamping device 38, which clamps the blocks together from four opposing sides, so that the blocks are closely positioned as at location 39 for binding and subsequent packaging.

As can be appreciated, the above mode of operation has been described by way of an automated procedure. However, any of the manufacturing steps may instead be carried out manually. Further, the mould and ram may be constructed to form a single block or plurality of blocks in a single working cycle. The shape and configuration of the blocks may be user specified so that the apparatus can produce blocks for a number of different purposes. For example, a reflective block made in accordance with the present invention, may be used for either directional arrows in a road, divider lines, double yellow or white lines, road humps, numbering or wording, curbstones or pavers and may be manufactured in any required color such as white, yellow or red. The blocks may also be made without reflective material, if required.

However, the most significant advantage resides in the blocks being made by utilising a dry casting technique combined with compaction since this allows a substantially shorter curing time, as compared to that associated with wet casting, whilst complying with compressive strength requirements set out in BS 6717: Part 1: 1993, to thereby improve production rates and efficiency.

Finally, it is to be understood that the inventive concept in any of its aspects can be incorporated in many different constructions so that the generality of the preceding description is not to be superseded by the particularity of the attached drawings. Various alterations, modifications and/or additions may be incorporated into the various constructions and arrangements of parts without departing from the spirit or ambit of the invention.

The claims defining the invention are as follows:

1. A dry casting method for forming a concrete block having a reflective fascia portion comprising the steps of:

preparing a base mix with a water/cement ratio less than or substantially equal to 0.35;

pouring the base mix into a mould;

pouring a dry fascia mix into the mould, said dry fascia mix having a water-cement ratio of between 0.28 to 0.35;

pressurizing both the base mix and fascia mix simultaneously with a compaction force, whereby both the base mix and the fascia mix are pressurized during the step of pressurizing; and providing a reflective material in the fascia mix.

2. The method as recited in claim 1, further comprising the step of providing a binding agent between the base mix and the fascia mix prior to the step of pressurizing.

3. The method as recited in claim 1, wherein the reflective material is provided on a surface of the fascia mix prior to the step of pressurizing.

4. The method as recited in claim 1, said step of pressurizing said fascia mix and said base mix is conducted for approximately 18 seconds at a pressure of a least 120 bars, wherein a block having a compressive strength of not less than 40 N/mm$^2$ is formed.

5. The method as recited in claim 1, wherein the fascia mix includes at least one colored pigment.

6. The method as recited in claim 1, further comprising the step of curing the block after the step of pressurizing, the curing taking from eight to twelve hours.

7. The method as recited in claim 1, wherein the step of preparing the base mix includes the step of mixing cement with granite chips which fail to exceed 9 mm in diameter.

8. The method as recited in claim 1, further comprising the steps of:

compressing the base mix prior to application of the compaction force as so to create a recess defined by the base mix and the mould; and placing the fascia mix into the recess during the step of pouring.

9. The method as recited in claim 8, further comprising the step of vibrating the base mix prior to the step of pressurizing so as to enhance filling of the mould and subsequent compaction.

10. The method as recited in claim 8, further comprising the step of preparing the base mix by mixing cement with granite chips which fail to exceed 9 mm in diameter and sand particles which fail to exceed 5 mm in diameter to enhance binding properties of the block.

11. The method as recited in claim 1, wherein the reflective material is glass beads.

12. The method as recited in claim 11, wherein the fascia mix includes cement and at least one colored pigment.

13. The method as recited in claim 12, wherein the glass beads are from 20 to 35% of the fascia mix.

\* \* \* \* \*

UNITED STATES PATENT AND TRADEMARK OFFICE
CERTIFICATE OF CORRECTION

PATENT NO. : 6,616,874 B1
DATED : September 9, 2003
INVENTOR(S) : Michael Lazar

It is certified that error appears in the above-identified patent and that said Letters Patent is hereby corrected as shown below:

<u>Title page,</u>
Item [30], please add the following priority documents:
-- Philippines, 58570 filed November 19, 1997
  Thailand, 034661 filed December 9, 1996 and
  Malaysia, PI 9605550 filed December 30, 1996 --

Signed and Sealed this

Ninth Day of March, 2004

JON W. DUDAS
*Acting Director of the United States Patent and Trademark Office*